July 28, 1959 W. KOHLHAGEN 2,897,381
COMMUTATOR-TYPE ELECTRIC MOTOR OF REGULATED OUTPUT TORQUE
Filed May 1, 1957 3 Sheets-Sheet 1

INVENTOR.
Walter Kohlhagen
By:
Attorney.

July 28, 1959 W. KOHLHAGEN 2,897,381
COMMUTATOR-TYPE ELECTRIC MOTOR OF REGULATED OUTPUT TORQUE
Filed May 1, 1957 3 Sheets-Sheet 2

INVENTOR.
Walter Kohlhagen
BY
Attorney.

July 28, 1959
W. KOHLHAGEN
2,897,381
COMMUTATOR-TYPE ELECTRIC MOTOR OF REGULATED OUTPUT TORQUE
Filed May 1, 1957
3 Sheets-Sheet 3
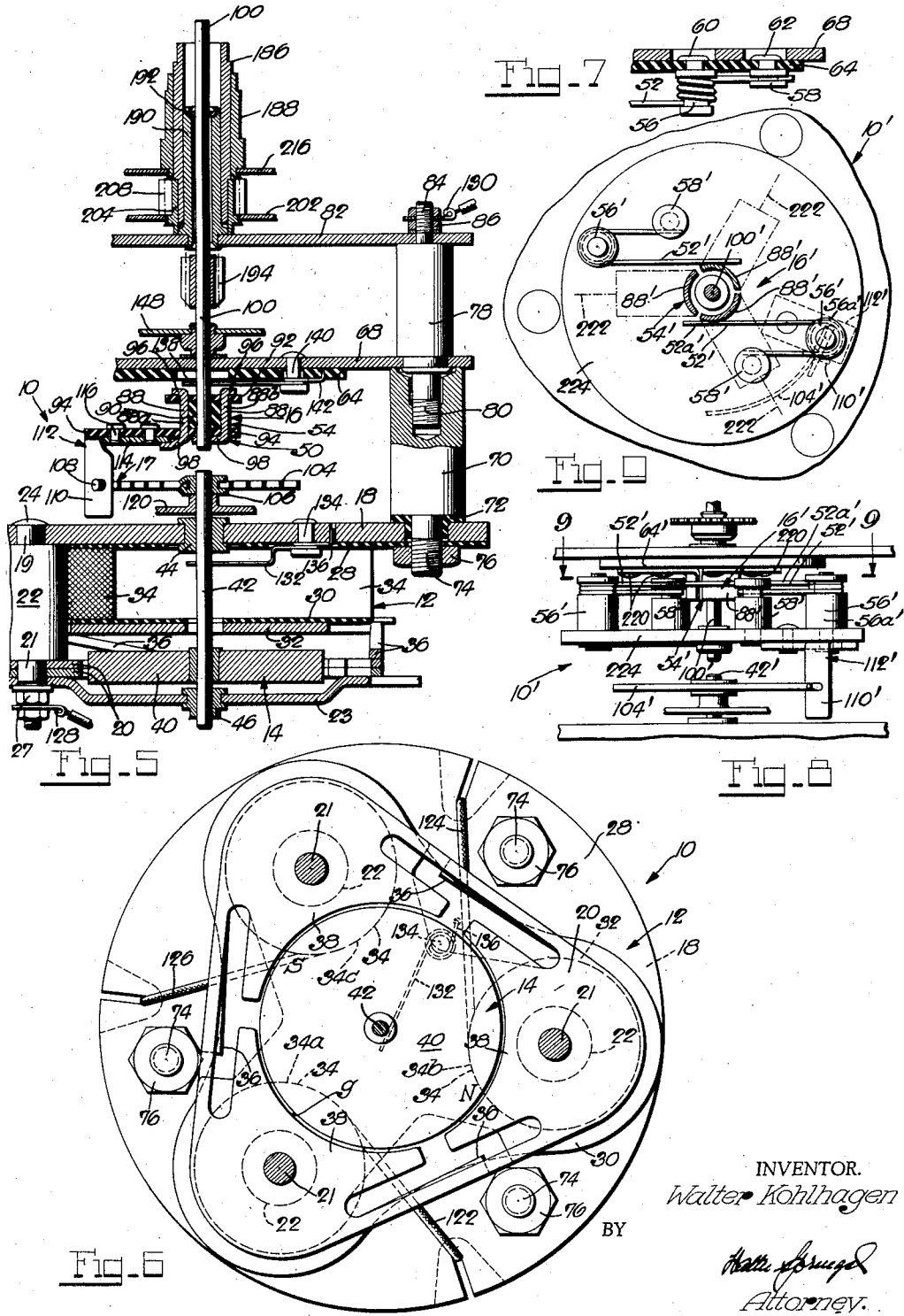
INVENTOR.
Walter Kohlhagen
BY
Attorney.

United States Patent Office 2,897,381
Patented July 28, 1959

2,897,381

COMMUTATOR-TYPE ELECTRIC MOTOR OF REGULATED OUTPUT TORQUE

Walter Kohlhagen, Elgin, Ill., assignor to The E. Ingraham Company, Bristol, Conn., a corporation of Connecticut Application May 1, 1957, Serial No. 656,280

1 Claim. (Cl. 310—40)

This invention relates to commutator-type electric motors of regulated output torque.

The motor to which the present invention generally pertains is of the type disclosed in the patent to Putnocky, No. 2,624,017, dated December 30, 1952. This motor features a rotor unit comprising a rotor and the rotary unit of a commutation device, in this case the commutator, of which the latter and the rotor are separated from each other and drivingly connected by a preloaded coupling spring which compels the commutator to turn in the same direction as the rotor. The commutator in this prior motor is under the control of an escapement so that the magnetic field in the field structure, and hence also the rotor, will advance rotatively in intermittent steps between rest periods which are also under the control of the escapement. Either the rotor or the commutator may be used as the output element of the motor. If the rotor is used as the output element, the full magnetic motor torque is available for utility purposes and the rotor will step after equal time intervals under the control of the escapement. If the commutator is used as the output element, the output torque is furnished by the preloaded coupling spring and, hence, may be considerably smaller in magnitude than the magnetic torque in the motor, and the commutator will also turn at a rate controlled by the escapement. There is also provided in this prior motor a lost-motion connection between the rotor and commutator which permits relative rotation between the latter through a limited range within part of which the rotor may turn in phase with the magnetic field in the field structure, and to one end of which the coupling spring will, on interruption of the current, urge the commutator and rotor so that the latter will continue in the same phase relation with the magnetic field on reapplication of the current.

It is the primary object of the present invention to provide a motor of this type which is simple and rugged in construction and readily lends itself to efficient mass production at exceedingly low cost, yet is highly reliable in operation for a long time.

Accordingly, it is among the objects of the present invention to provide a motor of this type in which the coils are advantageously arranged in the field structure, and to provide for proper sequential commutation of the coils by and under the control of a commutation device, and by additional conductors in the motor which are fixed in relation to each other and devoid of flexible leads and slip rings and, hence, will carry the current without likelihood of a break for the longest time.

It is another object of the present invention to provide a motor of this type in which conventional contacting parts of the motor, including the coupling spring between the rotor and the rotary unit of the commutation device, serve also as the aforementioned additional conductors, thereby not only greatly reducing the number of special conductors for the circuit connections between the current source, the commutation device and the field coils and accordingly simplifying the assembly and construction of the motor and reducing its cost, but also affording a ready current path through the motor between convenient terminals on the field structure and on the bearing for the rotary unit of the commutation device on simply insulating this bearing from the field structure.

It is a further object of the present invention to provide a motor of this type in which the companion elements of the aforementioned lost-motion connection are relatively floatable radially of the rotory axes of the rotor and the rotary unit of the commutation device, thereby permitting the spring to function additionally as a coupling of flexible type between the rotor and the rotary commutation unit and properly drive the latter despite even wide tolerance in its axial alignment with the former. In this arranging the lost-motion connection and permitting the spring to act additionally as a coupling of flexible type, all binding tendenices between the rotor and the coupled rotary commutation unit are eliminated, and the assembly of the motor is even further simplified and the motor cost further reduced by the absence of any requirement of accuracy in the axial alignment of the rotor and rotary commutation unit.

Other objects and advantages will appear to those skilled in the art from the following, considered in conjunction with the accompanying drawings.

In the accompanying drawings, in which certain modes of carrying out the present invention are shown for illustrative purposes:

Fig. 1 is an elevational view of a motor embodying the present invention and as used in an exemplary clock;

Figs. 2, 3 and 4 are cross sections taken on the lines 2—2, 3—3 and 4—4, respectively, of Fig. 1;

Fig. 5 is a fragmentary longitudinal section through the motor in the exemplary clock, taken substantially on the line 5—5 of Fig. 4;

Fig. 6 is a cross section taken substantially on the line 6—6 of Fig. 1;

Fig. 7 is a fragmentary section taken substantially on the line 7—7 of Fig. 3;

Fig. 8 is a fragmentary elevational view of a motor embodying the present invention in a modified manner; and Fig. 9 is a cross section through the modified motor as taken on the line 9—9 of Fig. 8.

Figure 1:
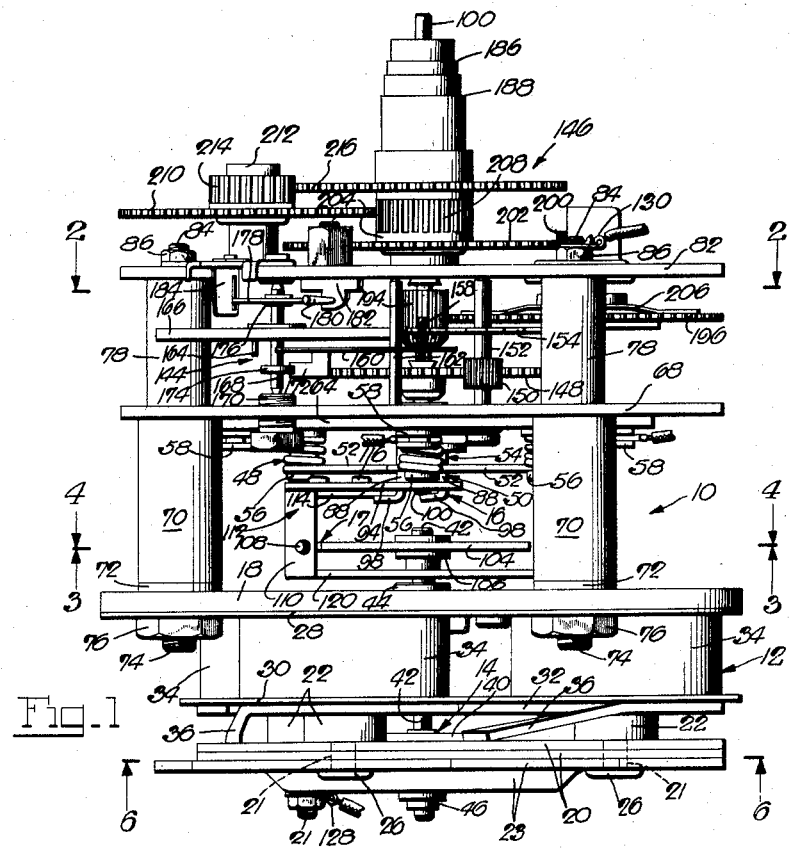
Figure 3:
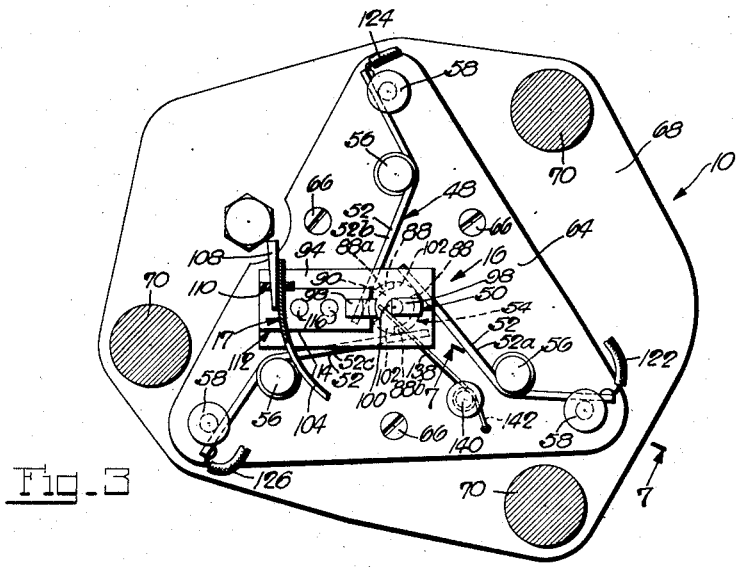
Figure 4:
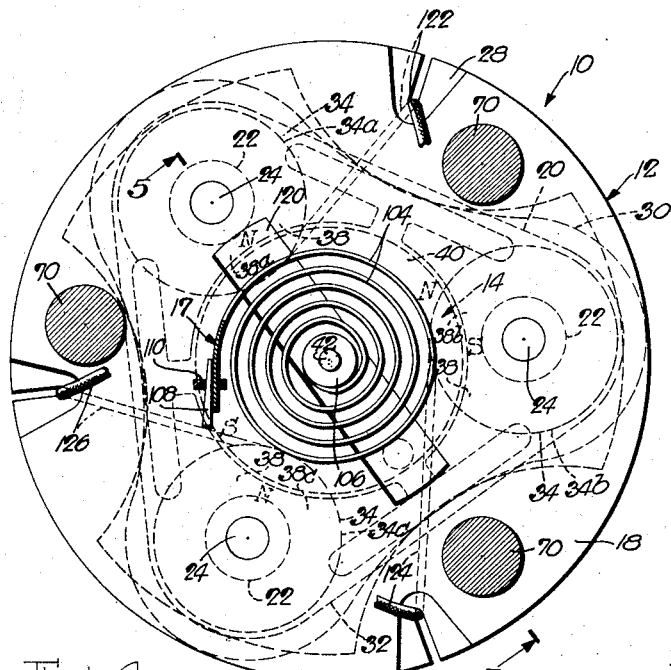

Referring to the drawings, and more particularly to Figs. 1 and 3 to 6 thereof, the reference numeral 10 designates a motor which has as its major components a field structure 12, a rotor structure 14, a commutation device 16, and a driving connection 17 between the rotor structure and the commutation device. The field structure 12 comprises a field plate 18, one or more pole plates 20, and equiangularly spaced ferromagnetic cores 22, presently three, which are interposed between the plates 18 and 20 and hold the latter in spaced parallel relation. To this end, shanks 19 on adjacent ends of the cores 22 are conveniently riveted to the field plate 18 as at 24 (Figs. 4 and 5), while their opposite end shanks 21 extend through the pole plates 20 and a superposed nonmagnetic end plate 23 and are secured to the latter. Thus, the end shanks 21 of two of the cores 22 are conveniently riveted over the end plate 23 as at 26 (Fig. 1), while the end shank 21 of the remaining core 22 is, for a reason hereinafter described, preferably threaded and receives a nut 27 for its attachment to the end plate 23. Surrounding the cores 22 and interposed between the field plate 18 and a retainer plate 32, preferably through intermediation of insulation pieces 28 and 30, respectively, are field coils 34. The plate 32 firmly holds the field coils 34 against the field plate 18, plate 32 having to this end punched-out prongs 36 which are bent out of the plane of the latter and rest against the nearest pole plate 20 (Figs. 1 and 5). The plates 20 are provided with punched-out field poles 38 which are associated with the field coils 34 (Figs. 6 and 4).

The rotor structure 14 comprises a rotor 40 on a shaft 42 which, as shown in Fig. 5, is journalled in suitable bearings 44 and 46 in the field plate 18 and end plate 23, respectively, so as to maintain an air gap $g$ of uniform width between the periphery of the rotor 40 and the field poles 38 (Fig. 6). The rotor 40 is, in this instance, a permanent-magnet disc having two opposite N and S poles (Figs. 4 and 6).

The commutation device 16 comprises a fixed unit 48 and a rotary unit 50, of which the fixed unit is, in the present example, a set of brushes 52, while the rotary unit is a commutator 54. The brushes 52, of which there are presently three due to their direct connection with the field coils 34, respectively, as described hereinafter, are in this instance in the form of simple conductive wire-type torsion springs which are anchored on posts 56 (Figs. 1 and 3) and urged into engagement with the commutator 54 by being backed with their outer ends against further posts 58. The posts 56 and 58 are suitably mounted, and preferably riveted as at 60 and 62, to an insulation plate 64 (Figs. 3 and 7) which, in turn, is screwed at 66 to a plate 68 that is electrically conductive for reasons hereinafter explained whereby the brushes 52 are insulatingly carried by the conductive plate 68 through intermediation of the insulation plate 64. The conductive plate 68 is, in turn, carried by the field plate 18 in electrically insulated and spaced relation therewith through intermediation of pillars 70. To this end, the lower ends of the pillars 70 rest on flanged insulating bushings 72 in the field plate 18 (Figs. 1 and 5), and their reduced shanks 74 thereat project through these bushings and receive nuts 76 which bear against the insulation piece 28 on the field plate 18. The plate 68 rests on top of the pillars 70 and is held thereon by additional pillars 78 the reduced bottom shanks 80 of which are threadedly received in the respective pillars 70 (Fig. 5). The pillars 78 serve to support another plate 82 on the plate 68 in spaced relation therewith. To this end, the reduced top shanks 84 on the pillars 78 extend through the plate 82 and receive nuts 86.

The commutator 54 comprises conductive segment elements 88, presently two in view of the exemplary provision of three brushes 52. The commutator 54 further comprises an insulating core 90 and opposite insulating end pieces 92 and 94 through which extend end prongs 96 and 98, respectively, of the segment elements 88 that are bent over in the fashion shown in Fig. 5 for the assembly of the commutator parts 88, 90, 92 and 94 into a self-contained unit which is firmly mounted on a shaft 100, journalled in the plate 68 and also in the plate 82 in a manner described hereinafter. The segment elements 88 are equiangularly spaced from each other, and are of such peripheral extent that at least two of the brushes 52 will in any angular position of the commutator engage the segment elements 88a and 88b, respectively. The commutator segments 88 are received in longitudinal recesses in the insulating core 90 so that segmental portions 102 of the latter extend between the conductive segment elements 88 and are peripherally flush therewith (Fig. 3).

The driving connection 17 between the rotor structure 14 and the commutation device 16 comprises a coupling spring 104 and anchor connections of its ends with the rotor shaft 42 and the rotary unit of the commutation device, presently the commutator 54. To this end, the coupling spring 104, which is preferably of spiral coiled type, is with its inner end secured, presently in the conventional manner (Fig. 5) of a hairspring movement, to a collet 106 on the rotor shaft 42, while the outer end of the coupling spring is anchored by a wedge 108 in a leg 110 of an L-shaped bracket 112 which with its other leg 114 is secured, by rivets 116, for instance, to the insulating arm or end piece 94 of the commutator 54.

Since the commutator-carrying shaft 100 is presently the output or load shaft of the motor and is to receive torque from the coupling spring 104, and since the required torque output in this case greatly exceeds the torque imparted to the shaft 100 solely by virtue of the stepping of the rotor structure 14 in phase with the rotating magnetic field in the field structure 12, it follows that the spring 104 must be prewound to an extend near which it will impart the required torque to the shaft 100 when the motor runs, and must remain so prewound when the motor stops as the spring would otherwise unwind and the motor become inoperative. To this end, there is provided between the rotor structure 14 and the rotary unit of the commutation device 16 a lost-motion connection which presently is in the form of a phase arm 120 on the rotor shaft 42 and cooperates with the leg 110 of the bracket 112 on the arm 94 of the commutator 54 in a manner more fully explained hereinafter.

The field coils 34 may be connected in Y or Δ fashion, and in this case may be considered to be connected in Y fashion, with their one ends connected with each other (not shown). The other ends of the field coils 34a, 34b and 34c are connected with the brushes 52a, 52b and 52c, respectively, through leads 122, 124 and 126, respectively, which for the sake of simplicity are shown as flexible conductors (Fig. 3, 4 and 6) but are preferably rigid conductors. Since the rotor 40 is, in the present instance, of permanent-magnet type, the current required for operating the motor is D.C. For its connection with a current source, the motor is provided with terminals 128 and 130 either one of which may be the positive terminal and the other one the negative terminal. Assuming now that the terminal 128 is the positive terminal (Fig. 5), the current flow through the motor in the exemplary relative angular position of the fixed and rotary units of the commutation device 16 (Fig. 3) is via the terminal 128, the associated core 22, stator plate 18, bearing 44, rotor shaft 42, collet 106, coupling spring 104, L bracket 112 and commutator segment 88a which by its bent-over lug 98 is electrically connected with the bracket 112 (Fig. 5), thence brush 52b (Fig. 3), conductor 124, the connected field coils 34b and 34c (Fig. 4), conductor 126, brush 52c (Fig. 3), commutator segment 88b, output shaft 100 (Fig. 5) by virtue of its press-fitted reception of the bent-over lug 98 of the commutator segment 88b, plate 68 and pillar 78 to the terminal 130. To assure a permanent and reliable electrical connection between the rotor shaft 42 and the fixed field plate 18, there is additionally provided a wiping contact in the form of a wire-type torsion spring 132 (Figs. 5 and 6) which is in contact with the rotor shaft 42, and is anchored on a post 134 in electrically conductive relation with the field plate 18 and kept loaded by having its end 136 locked to the latter. To assure a like permanent and reliable electrical connection between the rotary output shaft 100 and the fixed plate 68, there is additionally provided a wiping contact in the form of a wire-type torsion spring 138 (Figs. 3 and 5) which is in contact with the output shaft 100, and is anchored on a post 140 in electrically conductive relation with the plate 68 and kept loaded by having its end 142 locked to the insulation plate 64.

Figure 2:
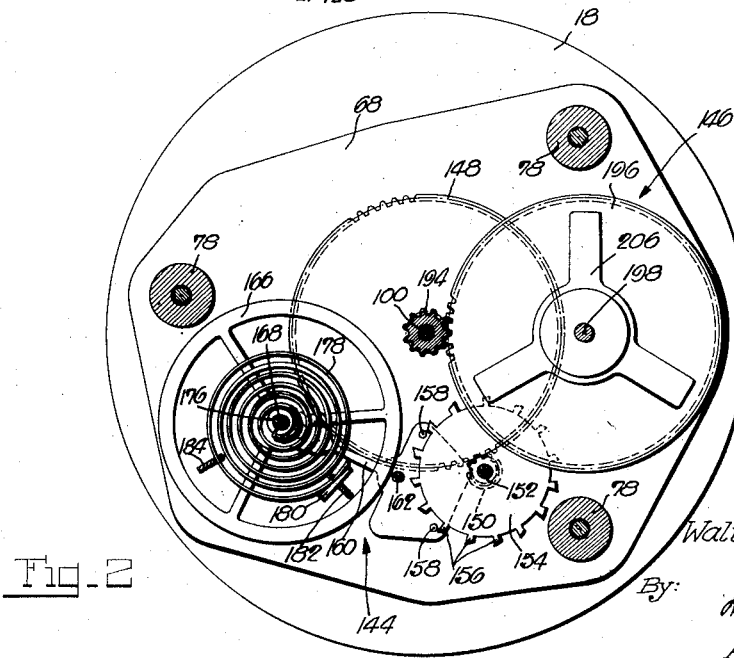

When the motor is running, the coupling spring 104 will remain wound beyond its prewind extent and will, between rewinds by the stepping rotor structure 14, partially unwind at a rate depending on the load on or permissible escape rate of the shaft 100. In the present example, the running rate of the output shaft 100 is under the control of an escapement 144 (Figs. 1 and 2), and the output shaft serves, as a further example, as the driver of a movement 146 for an automobile clock, for instance. To this end, the output shaft 100, which presently is also the second sweep shaft of the movement, carries a gear 148 which is in permanent mesh with a pinion 150 on a staff 152 which is suitably journalled in the plates 68 and 82 and carries an escape wheel 154. Cooperating with the teeth 156 of the escape wheel 154 in conventional manner are the pallet pins 158 on one end of an escape lever 160 on a staff 162 which is suitably journalled in the plates 68 and 82. Cooperating with the other end of the escape lever 160 in conventional manner are impulse pins 164 on a balance wheel 166 on a staff 168 which is journalled in the plate 82 and in a suitable bearing 170 in the plate 68. The escape lever 160 is also provided with a guard 172 which cooperates in conventional manner with a roller 174 on the staff 168. Secured to a collet 176 on the staff 168 is the inner end of a hairspring 178, the outer end of which is secured by a wedge pin 180 to an anchor piece 182 on the plate 82. A regulator 184 for the hairspring 178 may also be provided on the plate 82. The escapement 144 just described thus permits the output shaft 100 to turn or escape at a uniform time rate.

The movement 146, besides including the escapement 144, comprises a minute shaft 186 and an hour shaft 188 which carry conventional minute and hour hands (not shown). The minute shaft 186 is journalled on a mounting sleeve 190 on the plate 82 (Fig. 5), while the hour shaft 188 is journalled on the minute shaft 186. The output or second-sweep shaft 100 extends through the mounting sleeve 190 and is presently journalled therein through intermediation of a bearing ring 192 in the latter. The minute shaft 186 is driven at the proper rate from the output or second-sweep shaft 100 through a gear train (Figs. 1, 2 and 5) which comprises a pinion 194 on the shaft 100 that is in mesh with a gear 196 on a staff 198, suitably journalled in the plates 68 and 82 and carrying a pinion 200 which is in mesh with a gear 202 on a hub 204 that is fast on the minute shaft 186. Presently interposed between the gear 196 and the staff 198 is a conventional friction coupling 206 to permit setting of the minute and hour shafts and their hands without interrupting the normal drive of the movement. The hour shaft 188 is driven at the proper rate from the minute shaft 186. To this end, the fast hub 204 on the minute shaft 186 is provided with gear teeth 208 which are in mesh with a gear 210 that is journalled on a post 212 on the plate 82 and carries a pinion 214 which is in mesh with a gear 216 on the hour shaft 188.

Let it now be assumed that the motor is running in the correct direction for the drive of the exemplary movement 146, i.e. counterclockwise for the commutator 54 in Fig. 3 and clockwise for the rotor 40 in Fig. 4 due to the different directions in which the sections of these Figs. are taken, and let it be further assumed that the commutator 54 is in the momentary angular position shown in Fig. 3 in which the commutator segment 88b is just short of engagement with the brush 52a and is still in engagement with the brush 52c. Under these circumstances, current will pass from the previously assumed "hot" commutator segment 88a (Fig. 3) through the brush 52b, the conductor 124, the field coil 34b (Fig. 4), thence the connected field coil 34c, conductor 126, brush 52c (Fig. 3) and the other commutator segment 88b with its previously described ground connection, with the result that the field poles 38b and 38c will be of opposite polarity, in this instance S and N, respectively, as indicated in Fig. 4. Hence, the permanent-magnet rotor 40 will assume the position of minimum reluctance shown in Fig. 4 and will remain in this position for the short interval before the segment 88b of the commutator 54 on the escapement-controlled output shaft 100 comes into contact with the brush 52a, the coupling spring 104 meanwhile unwinding at its outer end clockwise as viewed in Fig. 4 and turning the commutator 54 on the output shaft 100 counterclockwise as viewed in Fig. 3 at the rate permitted by the escapement 144. The coupling spring 104 thus unwinds to the lower limit of its rewind range when on the counterclockwise drive of the commutator 54 (Fig. 3) the segment 88b thereof moves into contact with the brush 52a, the segment 88b moving shortly thereafter out of contact with the brush 52c. As soon as the commutator segment 88b moves into contact with the brush 52a, the field pole 38a (Fig. 4) becomes polarized, N in this instance, while the other field poles remain polarized as indicated, though the field pole 38c will remain thus polarized for only a brief interval thereafter, with the result that the rotor 40 swings clockwise as viewed in Fig. 4 and begins to rewind the spring 104, not stopping until after the commutator segment 88b has moved out of contact with the brush 52c and the rotor has moved into its new position of minimum reluctance in the magnetic field in the field structure 12 which in the present example is 60 degrees clockwise from its indicated position of minimum reluctance in Fig. 4. On reaching its new position of minimum reluctance, the rotor 40 has rewound the coupling spring 104 to the upper limit of its rewind range, and the same will again unwind to the lower limit of its rewind range and drive the output shaft 100 under the control of the escapement by the time the next commutation change in the field coils occurs and renewed rewinding of the spring takes place, as will be readily understood. The rotor 40 thus advances in intermittent steps of 60 degrees in this example and periodically rewinds the spring 104 while the latter keeps up its continuous drive of the output shaft at a torque which, while fluctuating slightly due to the periodic rewind of the spring, is to all intents and purposes constant for many practical applications, including the drive of the exemplary movement 146.

On interruption of the current, the loaded coupling spring 104 will in this instance turn the rotor 40 backwards or counterclockwise as viewed in Fig. 4 until the phase arm 120 backs against the leg 110 of the L bracket 112 on the commutator 54. When this occurs, the wind of the coupling spring 104 is reduced to its prewind extent. The phase arm 120 may be of insulating material or of metal. No harm is done if the phase arm 120 is electrically conductive, since the same is in that event merely momentarily connected in parallel with the torque spring 104 when current is reapplied to the motor. Of course, it will be appreciated that the back-up of the rotor 40 in case of current interruption must necessarily be limited so that the rotor will return into the same phase relation with the magnetic field in the field structure 12 when the current is reapplied to the motor. Thus, assuming that the current is interrupted when the commutator 54 assumes the angular position shown in Fig. 3 in which the magnetic field lies across the field poles 38b and 38c as described, it follows from Fig. 4 that the ensuing back-up of the phase arm 120 against the bracket leg 110 will leave the rotor 40 in an angular position from which it will readily return to its indicated position of minimum reluctance in the magnetic field across the field poles 38b and 38c when the current is reapplied to the motor.

While in the described motor 10 the commutator is the rotary part of the commutation device, Figs. 8 and 9 show part of a motor 10' which may in all respects be like the described motor 10, except that the rotary part of the commutation device 16' is formed by the brushes 52' and the fixed part of the commutation device is formed by the commutator 54'. Consequently, the brushes 52' will now lead the current to and from the commutator 54' and the segments 88' of the latter will switch the current to and from the field coils. The commutator segments 88', presently three, are secured at 220 to an insulation plate 64' and have connections 222 with their respective field coils. The brushes 52', presently two, are mounted on posts 56' and 58' on an insulation disc 224 on the output shaft 100', and are electrically connected with the motor terminals in the same manner as the commutator segments 88 in the described motor 10. Thus, in the present instance, the brush 52a' is through its anchor post 56a' electrically connected with a conductive L bracket 112' to the leg 110' of which is anchored the outer end of the conductive coupling spring 104' on the rotor shaft 42'.

It follows from the preceding that the instant motor in either of its forms achieves the aforementioned objectives. Thus, maximum use is made of conventional parts of the motor to conduct the operating current therethrough in a manner which will hardly ever give rise to interruption in the current path through the motor. This is highly advantageous not only from the viewpoint of achieving proper current conductance through the motor with a minimum number of special conductors and accordingly simplifying the assembly of the motor as well as reducing its cost, but also from the further viewpoint that the motor is exceptionally compact and in its performance rather immune to shock and vibration, such as will inevitably occur in an automobile clock and other practical applications of the motor. Moreover, the additional function of the spring between the rotor structure and the rotary unit of the commutation device as a coupling of flexible type even further simplifies the assembly of the motor and thus further reduces its cost, since even wide tolerances in the axial alignment of the rotor structure and rotary commutation unit are permissible in the assembly of the motor and for its proper performance. The permissible wide tolerances in the axial alignment of the rotor structure and rotary commutation unit also greatly facilitates the assembly of the motor with the rest of the exemplary automobile clock with the timekeeping elements of the latter advantageously and most effectively shielded from harmful flux in the magnetic circuit, as illustrated. Thus, the escapement and movement between the preferably nonmagnetic plates 68 and 82 may be spaced a safe protective distance from the magnetic field in the field structure of the motor by the simple expediency of pillars therebetween, i.e. the pillars 70, which are preferably of nonmagnetic material and the location of which on the plates 18 and 68 permits of wide tolerances. To make this possible, it is, of course, necessary that the lost-motion connection between the rotor structure and the rotary commutation unit be floatable radially of the rotary axes of the latter devices, and this is achieved by the provision of the phase arm 120 which on its back-up against the leg 110 of the L-bracket 112 on the rotary commutation unit (Fig. 4) acts like a shoulder engaging a shoulder on the latter.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claim are intended to be embraced therein.

What is claimed is:

In a motor, the combination with a field structure having coils, and a rotor structure, a commutation device for sequentially energizing said coils to produce in said field structure a rotary magnetic field for driving said rotor structure in phase therewith, said device including rotary and fixed units of which one unit is a commutator with conductive segment elements and the other unit is a set of brush elements, with the elements of said fixed unit electrically connected with said coils and said rotary unit being in substantial axial alignment with said rotor structure; bearing means for said rotary unit; a preloaded spiral coiled spring interposed and forming the sole driving connection, as well as serving as a flexible coupling, between said rotor structure and rotary unit and urging the latter in the drive direction of the former; companion stop shoulders on said rotor structure and rotary unit, respectively, permitting relative rotation between said rotary unit and rotor structure through a limited range within part of which the latter may turn in phase with the magnetic field, and to one end of which said spring will, on deenergization of said coils, urge said rotary unit and rotor structure so that the latter will continue in the same phase relation with the magnetic field on reenergization of the respective coils, the stop shoulder on said rotary unit being electrically insulated from at least one of said elements thereof; and electrical connectors between a current source and said elements of said rotary unit, including said spring and an electrical connection between the latter and the other element of said rotary unit.

References Cited in the file of this patent

UNITED STATES PATENTS

| | | |
|---|---|---|
| 1,838,152 | Phelan | Dec. 29, 1931 |
| 2,340,697 | Russell et al. | Feb. 1, 1944 |
| 2,624,017 | Putnocky | Dec. 30, 1952 |
| 2,753,501 | Brailsford | July 3, 1956 |